United States Patent [19]
Checketts

[11] Patent Number: 5,817,157
[45] Date of Patent: Oct. 6, 1998

[54] HYDROGEN GENERATION SYSTEM AND PELLETIZED FUEL

[76] Inventor: Jed H. Checketts, 137 W. Goltz Ave., Salt Lake City, Utah 84101

[21] Appl. No.: 889,966

[22] Filed: Jul. 10, 1997

Related U.S. Application Data

[62] Division of Ser. No. 582,103, Jan. 2, 1996, Pat. No. 5,728,464.

[51] Int. Cl.⁶ .................................. B01J 7/00; B01J 8/02; C10J 3/18
[52] U.S. Cl. ..................................... 48/61; 48/65; 48/204; 422/211; 422/239
[58] Field of Search ................................. 48/61, 65, 204; 422/211, 239

[56] References Cited

U.S. PATENT DOCUMENTS

| | | | |
|---|---|---|---|
| 3,683,622 | 8/1972 | Von Krusenstierna | 60/207 |
| 4,155,712 | 5/1979 | Taschek | 422/239 |
| 4,261,995 | 4/1981 | Bailey, Jr. et al. | 422/239 |
| 4,356,163 | 10/1982 | Davidson | 423/657 |
| 4,988,486 | 1/1991 | Harris et al. | 422/191 |
| 5,510,201 | 4/1996 | Werth | 429/17 |
| 5,514,353 | 5/1996 | Adlhart | 422/239 |
| 5,593,640 | 1/1997 | Long et al. | 422/111 |

OTHER PUBLICATIONS

Sodium Hydride "Inorganic Syntheses", Chapter 2, Sodium Dispersions Submitted by T.P. Whaley, checked by C.C. Chappelow, Jr. pp. 6–13.
Article submitted to *Chemical and Engineering News* "The Production of Sodium Hydride and Some of Its Reactions" by V.L. Hansley and P.J. Carlisle, Technical Division, du Pont, pp. 1332–1333, 1380.

The Kirk Othmer Encyclopedia of Chemical Technology Third Edition, vol. 21 pp. 181–203 "Sodium and Sodium Alloys".

*Primary Examiner*—Nina Bhat
*Attorney, Agent, or Firm*—M. Reid Russell

[57] ABSTRACT

A demand type portable hydrogen generation system operated to replenish hydrogen gas to a storage tank or vessel as hydrogen is drawn therefrom. The system employs electrical and mechanical arrangements for opening an outer coating of a pellet that has been formed over a reactive material, such as sodium, to expose that pellet reactive material to water, and generate hydrogen gas from a chemical reaction between which reactive material and water. An electrical system variation of the system employs a bank of cells where each cell is electrically connected through a controller to a power source with the vessel to contain a measured volume of a light salt and water solution with an aluminum coated sodium pellet or pellet coated with another appropriate metal positioned therein, and provides for passing an electrical current to a select cell to break down the aluminum coating of a pellet contained therein and expose the pellet reactive material to the water, generating hydrogen. In a mechanical system variation of the system, sodium pellets are individually coated with a water impervious soft plastic, or like material, and are maintained in water contained in the vessel and including an arrangement for opening the pellet water impervious coating a when hydrogen gas pressure in the vessel falls below the pressure of a static source to open a pellet to the vessel water and chemical react therewith to generate hydrogen gas to restore system pressure to a pressure that is greater than that of the static source.

18 Claims, 12 Drawing Sheets

HYDROGEN GENERATION SYSTEM AND PELLETIZED FUEL

This is a division of application Ser. No. 08/582,103, filed Jan. 2, 1996 now U.S. Pat. No. 5,728,464.

BACKGROUND OF THE INVENTION

1. Field of the Invention

This invention relates to coated alkali metal or metal hydride pellets and their use in demand type hydrogen generation systems for selectively opening a pellet or pellets to water for providing a controlled generation of hydrogen.

2. Prior Art

It has long been recognized that hydrogen gas can be used as a fuel for internal combustion engines, fuel cells, and the like. Where hydrogen has been produced commercially, as for example, from a steam/colte process or as a by-product from the chlor-alkali industry, to contain the produced gas that must initially be at high pressure, a very strong heavy container is required to maintain a significant volume of gas, limiting a portable use. Similarly, to contain hydrogen in a liquid state has also required a strong and therefore heavy containment vessel, limiting use as a portable supply. Which problems of a requirement for a heavy strong container are overcome by a demand system like that of the invention.

An example of a production of hydrogen from a chemical reaction of an alkali metal with water is shown in a patent to Davidson, U.S. Pat. No. 4,356,163. The Davidson patent, however, does not show a coating of chemical spheres and their arrangement and use in a device for producing hydrogen on demand, that are like the embodiments of the invention, as set out herein.

A demand system of the invention is, of course, one where the system produces hydrogen on a need basis. Such produced gas is at a low pressure thereby requiring only a nominally strong container to safely maintain it, enabling a practical installation of the system in a vehicle, or the like, that will use the produced hydrogen as a fuel. A desirability of such demand system has been recognized in patents to Taschek, U.S. Pat. No. 4,155,712 and to Bailey, Jr. et al, U.S. Pat. No. 4,261,955. These patents, however, show systems that are unlike the present invention. With the Taschek patent showing a system that includes a housing containing a membrane that is arranged to separate a water filled container and a container of chunks or pellets of a metal hydride or alkali metal, with the water to slowly diffuse through the membrane. This diffusion is to be controlled by a pressure differential as exists across the membrane. The system of the Taschek '712, as shown, is simple and apparently easy to construct and, as the anticipated pressure of the gas produced would be low, could conceivably utilize a thin walled light weight gas holding tank appropriate for use in a portable system. While the Taschek '712 patent can be interpreted as showing a demand system, in practice it would be unreliable as, in the event of a rupture to the membrane separating the water filled container and the container of alkali metal, all of the alkali metal would immediately be exposed to the water, creating a rapid production of hydrogen and an overpressure condition. Such rapid hydrogen production would likely rupture the container causing a release of hydrogen into the air, which release could potentially result in an explosion. Further, as to system functioning, over time the speed of water vapor diffusion through the membrane will vary as the membrane pores clog. Also, a metal hydride will tend, over time to cake, prohibiting a complete chemical reaction. For these and other reasons the system of the Taschek '712 patent cannot be practically applied as a reliable portable system.

The subsequent '955 patent to Bailey, Jr. and Taschek seeks to solve the safety problems as are inherent in a single membrane system by employing a pair of membranes to separate the metal hydride and water with a dead space therebetween. While, with a use of two membranes, a likelihood of a membrane tearing as would create a catastrophic failure is somewhat minimized, that danger is not eliminated. Further, the inherent problems of membrane porosity and metal hydride caking have not been addressed in this '955 patent. The present invention is distinct therefrom in that, while it is also a demand system with hydrogen gas produced as needed and involves a chemical reaction of an alkali metal or hydride metal and water, the invention provides for a selected exposure of pellets of the alkali metal or hydride metal to water such that there is no possibility that all the available pellet materials would be exposed to water even in a tank rupture. Unique to the invention pellets of an alkali metal or hydride metal are formed as spheres, cubes, or other appropriate shape, that are encapsulated within a shell or coating of a material that is impervious to water. The coating provides a barrier to exposure of the pellet core even when the pellet is covered by a salt water solution and must be opened, dissolved, or otherwise penetrated for the pellet material to react with water to form hydrogen. The invention provides for individually opening each pellet in turn to expose the pellet core to water, generating hydrogen to meet a demand. A preferred pellet coating or shell material is a metal such as aluminum to be dissolved when exposed to an electrical current, or a plastic, such as a high density polyethylene used where the pellet is split. So arranged, the invention involves a demand system for both opening pellets to water as a need for hydrogen gas generation upon sensing of a drop in hydrogen gas pressure below a set minimum, and for capturing the hydrogen gas generated by the reaction of the pellet material and water.

Such hydrogen gas, under pressure, as is produced and maintained in the system of the invention can then be conveniently used as a fuel source. For example, a use of hydrogen as a fuel for an internal combustion engine, fuel cell, or the like, is shown in a patent to Von Krusenstierna, U.S. Pat. No. 3,683,622. Heretofore, a practical light weight chemical hydrogen generation system like that of the present invention that is arranged to function as a demand system has not been known.

SUMMARY OF THE INVENTION

It is a principal object of the present invention to provide, as a fuel for a chemical hydrogen generation system, individual pellets that are formed of a reactive material such as an alkali metal or metal hydride that, on contact with water, produce hydrogen as a product of that reaction.

Another object of the present invention is to provide a demand system including an arrangement to open a coating or shell of an individual pellet upon sensing a need for generation of additional hydrogen so as to expose that pellet core to water to generate hydrogen gas that is then contained for use as a fuel.

Another object of the present invention is to provide for loading a number of the coated pellets into the system container or housing to be stored in water and providing for individually opening each pellet to expose it to water, generating hydrogen gas, upon a sensing of a minimum gas presence in the container, the generated hydrogen increasing the gas volume and pressure therein for use as a fuel source.

Another object of the present invention is to provide an arrangement for, on demand, selectively exposing individual alkali metal or metal hydride pellets, in turn, to water, producing hydrogen gas as a product of the reaction to restore pressure within a storage tank so as to maintain a desired pressure range therein.

Still another object of the present invention is to provide for coating of individual alkali metal or metal hydride pellets with a material that is water impervious but can be easily and quickly opened or broken down in the presence of a dilute alkaline solution, to expose the reactive material to water, producing hydrogen as a product of the chemical reaction.

Still another object of the present invention is to provide for coating a reactive material pellet with aluminum, or like metal, and providing a hydrogen generation system for containing the individual aluminum coated pellets in individual cells, that each contain a water and light salt solution that, on receipt of a voltage, forms sodium hydroxide that reacts with aluminum, disintegrating the aluminum cover and allowing the reactive material and water to chemically react to produce hydrogen gas that is stored at low pressure in the system.

Still another object of the present invention is to provide for coating a reactive material pellet with a plastic material, such as a polyvinyl chloride coating, and providing a hydrogen generation system arranged for cutting open the pellet as by forcing a pellet through a knife or guillotine blade, exposing the pellet core to water, generating hydrogen gas that is stored at low pressure in the system.

Still another object of the present invention is to provide a system for chemically producing hydrogen, on demand, to maintain hydrogen gas as a fuel at low pressure within a storage tank of the system, which, upon sensing a drop in pressure in the storage tank, the system is operated to add hydrogen gas from a reaction of a pellet of reactive material and water.

Still another object of the present invention is to provide a hydrogen generation system that can be used as a portable fuel source.

The present invention is a low pressure hydrogen generation system operated on demand for supplying hydrogen gas for use as a fuel, the system to utilize pellets that are formed from a reactive material and include water impervious outer coatings or shells formed thereover, with the system to provide, upon sensing of a minimum pressure of hydrogen gas therein, for opening an individual pellet to expose the pellet core to water, generating hydrogen to raise the system hydrogen gas pressure.

In one embodiment of a hydrogen generation system of the invention, the pellet of a reactive material, such as sodium, is formed into a sphere, cube, or like shape, and is coated with an electrically conductive material, such as aluminum. The individual coated pellets are for positioning in cells of a bank of individual cells that are each formed of a non-reactive material, such as steel. Each cell contains a light salt and water solution and each pellet is formed of sodium or another suitable alkali metal or metal hydride and its electrically conductive coating material is non-reactive in the salt water. Each cell is connected to receive a voltage supplied thereto as controlled by an electronic control system, such as a computer, the coating material upon receipt of the voltage to disintegrate in the presence of an alkaline mixture such as that created when a voltage is passed into a light salt and water solution. With the disintegration of the aluminum coating, the pellet core material reacts with the water in the cell to produce hydrogen gas as a product of that reaction. The produced hydrogen is vented to a tank system for storing the hydrogen at low pressure and connects to a system that utilizes hydrogen gas for fuel, such as an internal combustion engine, fuel cell, or the like. Which tank system includes a pressure sensing device for monitoring internal tank pressure and transmitting that information to the electronic control system that is preferably a computer. With, upon a sensing of a hydrogen pressure therein that is less than a set minimum, or a rapid change in tank pressure, the system provides for renewing hydrogen gas by selecting a particular cell or cells of the bank of cells, and passing a voltage to that cell or cells to disintegrate the pellet covering material. The pellet material in each cell is thereby exposed to and reacts with water, as set out above, producing hydrogen that is then passed from the individual cell to the storage tank, restoring the tank pressure to within a range of desired tank pressures.

For the above embodiment, the pellet coating material is preferably aluminum that coats a sodium sphere coated, such that when a voltage is passed into the light salt and water solution, a sodium chloride electrolysis is set up that produces sodium hydroxide that will attack the aluminum coating. The coating is dissolved in a matter of seconds and the sodium sphere is exposed to the cell water, reacting therewith to produce hydrogen as a product of that reaction. Also, the sodium hydroxide and aluminum reaction itself produces hydrogen and, accordingly, it is preferred that the sodium sphere contain a core of aluminum to react with a product of the sodium and water reaction, sodium hydroxide, releasing additional hydrogen and producing sodium aluminate.

The computer system of this embodiment both keeps track of the cells that have not been chemically reacted, and will project the number of cells that are needed to be reacted to restore the tank system pressure to within a desired pressure range. The computer system can also provide a hydrogen user with a running total of the number or percentage of cells that remain available for reaction, and the bank of cells is preferably arranged to be easily and quickly removed, when expended, and replaced with a fully charged system.

Second and third embodiments of the invention that are also low pressure hydrogen generation systems and are operated on demand, utilize coated reactive material pellets, with the pellet coating selected to be water impervious. A preferred pellet coating is a flexible plastic, such a high density polyethylene that provides to the pellet a durable flexible water impervious coating. So arranged, the coated pellets that are preferably formed as spheres from a reactive material that is an alkali metal, metal hydride or the like, such as sodium, will float in water. The coated pellets are for use in a closed housing that is at least partially filled with water to react with the pellet core to produce hydrogen that may be contained within the same housing. The housing is arranged to receive a number of the coated pellets and includes a carousel arrangement that is turned on operation of a reactor piston to drive a pellet into a fixed reactor blade, splitting the pellet and positioning a following individual pellet into alignment with a tube or chamber open end. The tube or chamber contains water. The pellet floats upwardly in, passing into a reactor chamber, to align with the reactor blade. Thereafter, where a need exists to produce additional hydrogen, a reactor piston is operated to drive the pellet into the fixed reactor blade, spiting the aligned pellet in half. The reaction within the pellet halves reacts with the surrounding water and produces hydrogen gas. The coating from the reacted pellet floats to the water surface.

The added hydrogen gas increases the gas pressure within the housing that is compared against a static pressure source. Thereafter, as the hydrogen gas is removed for use, the hydrogen gas pressure decreases to below the static pressure source whereat the static pressure source causes the reactor piston to be extended and a new pellet selected and positioned for passage to the reaction chamber. The reactor piston urges a pellet into the reactor blade, with the split pellet then generating hydrogen gas to increase the hydrogen gas pressure to above that of the static source, causing the reaction piston to retract.

Both the above set out system embodiments provide for replenishing hydrogen gas on a need or demand basis as hydrogen gas is withdrawn for use, as for example, for fueling an internal combustion engine or fuel cell. Accordingly, a low pressure of hydrogen gas only need be maintained, allowing the vessel or container wherein the hydrogen gas is generated and/or stored to be constructed from a light gauge of material such as steel to safely maintain a low pressure only. Such vessel or container will therefore be light in weight and accordingly can be safely arranged as a portable system in, for example, a vehicle for providing hydrogen gas to fuel an internal combustion engine or fuel cell that is the power source for that vehicle.

BRIEF DESCRIPTION OF THE DRAWINGS

These and other objects and features of the invention in hydrogen generation systems and fuel pellets therefore will become more fully apparent from the following description in which the inventions are described in detail in conjunction with the accompanying drawings.

DETAILED DESCRIPTION

The advantages to the use of hydrogen as a fuel source have long been recognized as have the problems associated with such use.

Nitrogen generated as a by-product from chlor-alkali production or hot steam passed over colte processes, it has long been well known that hydrogen gas can be produced in a chemical process utilizing an alkali metal or metal hydride reacted with water. Such chemical production is, however, not without problems, but can produce more hydrogen per system volume than other systems. Also, even though the materials that are preferred for use in this invention are not found free in nature, and large amounts of power are used in their refinement, these materials are still plentiful and comparatively cheap and their use in a system of the invention, as described below, is economically practical.

Heretofore, hydrogen generation systems have generally involved large and heavy storage tanks for storing hydrogen gas at high pressure. Such systems, therefore, have not been practical for use as portable systems. The hydrogen generation systems of the present invention all provide hydrogen on demand as hydrogen is produced in the invention as it is used and therefore require that only a low pressure tank be utilized for holding the produced gas. Accordingly, the embodiments of the present invention provide a first practical truly portable system that is suitable for producing hydrogen gas, as needs, to fuel an internal combustion engine, fuel cell, or the like.

Figure 1:
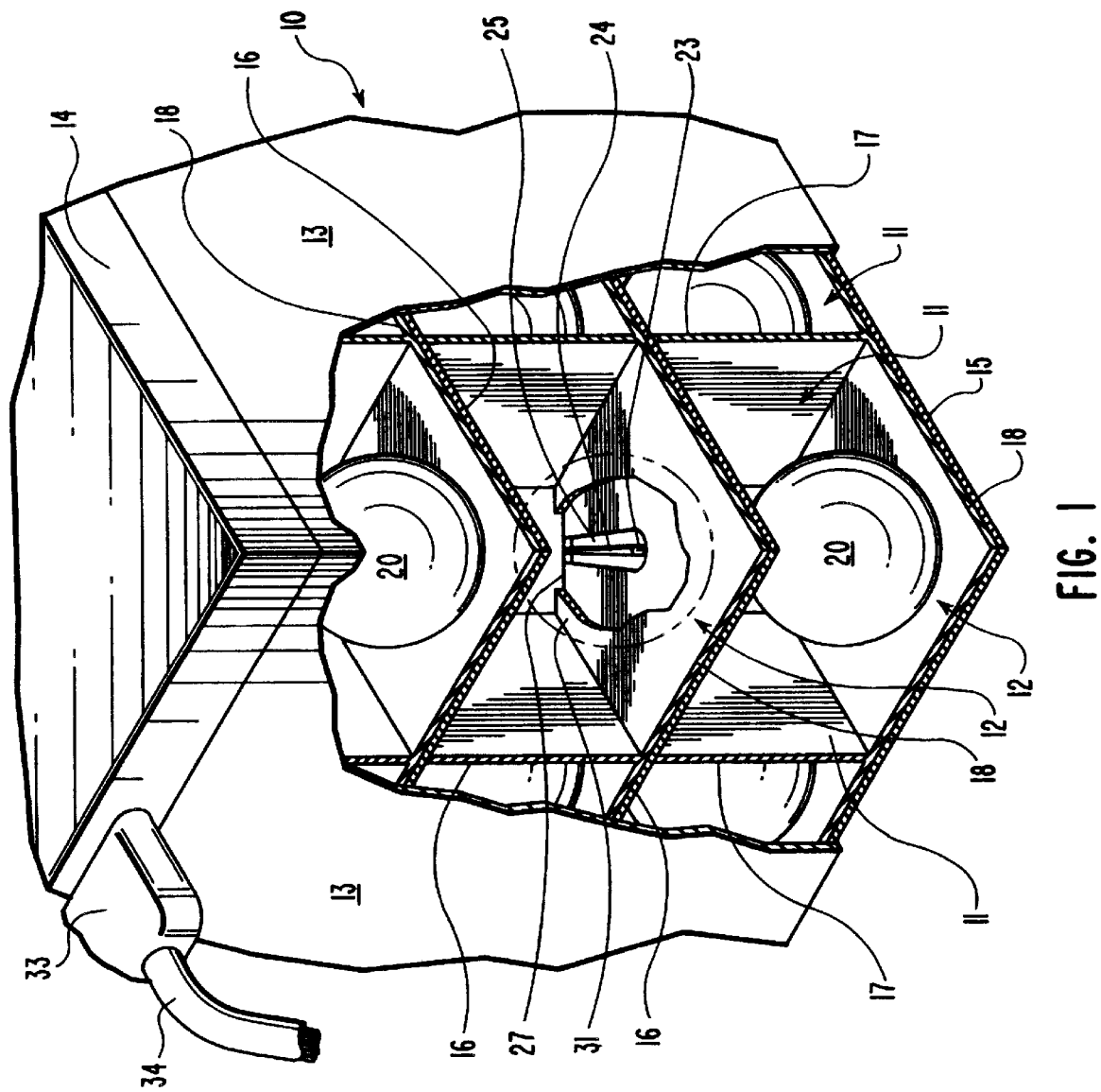
FIG. 1 shows a sectional view of a portion of a bank of cells of a first embodiment of a hydrogen generation system of the invention, showing an embodiment of coated spherical pellets of the invention maintained in top and bottom cells of a cell stack with a sphere shown in broken lines in a center cell, with a positive electrical contact shown extending into the center cell, and showing an electrical coupling plug fitted into a receptacle arranged in the side of the bank of cells.
Figure 2:
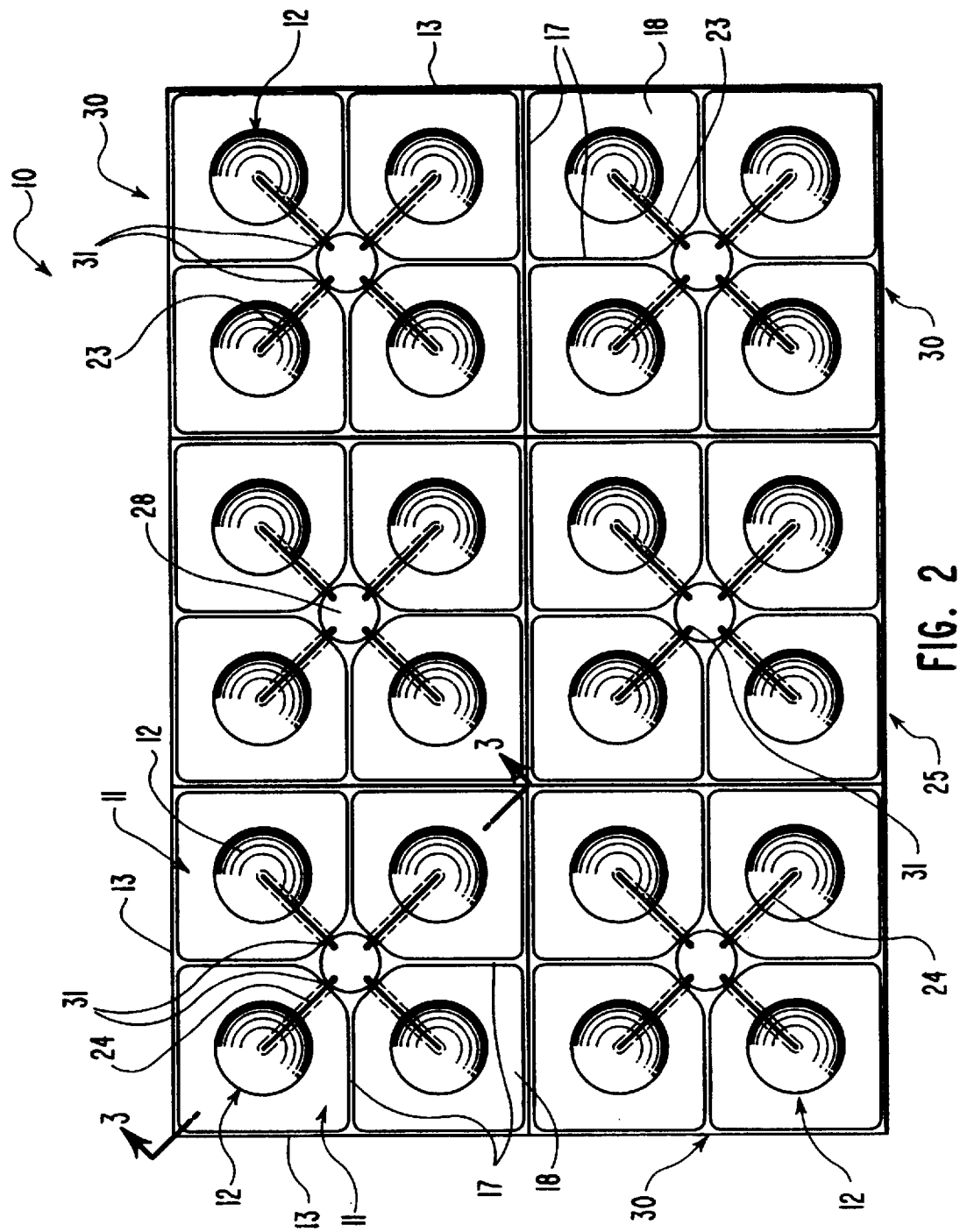
FIG. 2 shows a top plan view of the bank of cells of FIG. 1 with the top removed exposing a layer of cell segments, it being understood that each layer contain a number of segments of four individual cells each arranged as a square, the four cells shown as venting into a common center passage.

As a first embodiment of the present invention in a hydrogen generation system, FIG. 1 shows a corner of a bank of cells 10 that are groupings or segments of identical individual cells 11, with each cell shown as containing a coated pellet 12, of the invention. The bank 10 is preferably formed from a conductive material, preferably steel plates, forming an arrangement of interconnected individual plates 13 that upstanding walls and right angle corners. The groupings of cells are closed by a top section 14 and bottom plate 15, respectively, forming a rectangular shape bank of cells 10. Within the bank of cells 10, the individual cells 11 are formed between equally spaced horizontal flat dividers 16 and intersecting equally spaced vertical flat dividers 17. So arranged, the cells 11 are electronically isolated from one another, and each mounts a positive contact 23 therein, with all of the cells of the bank of cells 10 grounded. Electrically non-conductive horizontal spacers or separators 18 are preferably arranged within the bank of cells 10 for separating and insulating each cell from the cell below and above, with a corner of which separator 18 arranged to fit over the opening 31 of the cell below functioning as a flap valve. Accordingly, to function as flap valves, the spacers or separators 18 need to be formed of a flexible non-conductive material, such as rubber, plastic, or the like. Which material should also be non-reactive with the chemicals as are involved in the generation of hydrogen by the invention, and the products of which chemical reactions, as set out hereinbelow. A plastic material identified as Teflon™ manufactured by DuPont is preferred as the flexible non-conductive material as separators 18 of the invention.

Figure 3:
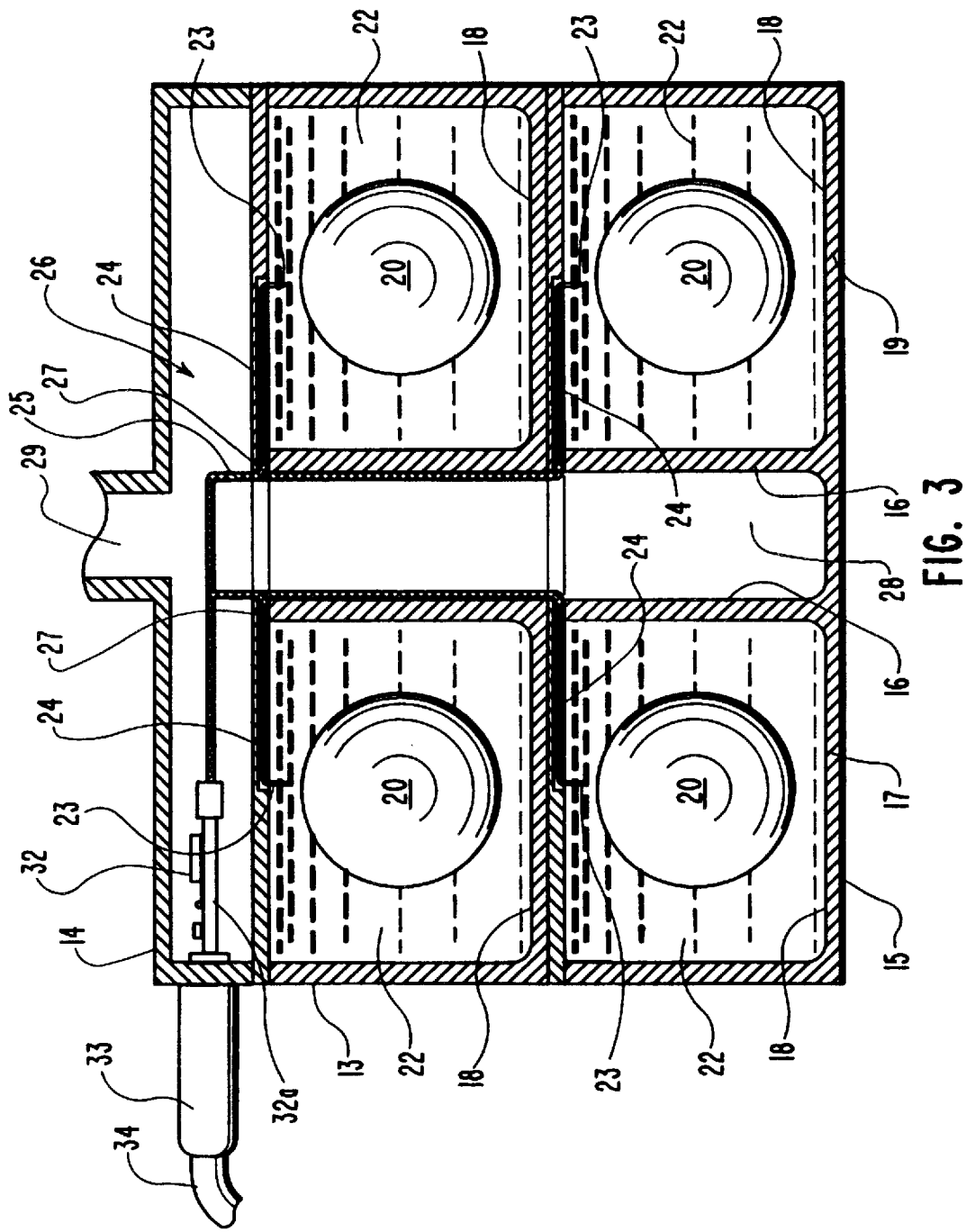
FIG. 3 shows an expanded side elevation sectional view of a two layer stack of cells taken along the line 3—3 of FIG. 2, and showing a positive electrical contact extending into each cell that connects through a circuit to a voltage source.
Figure 4:
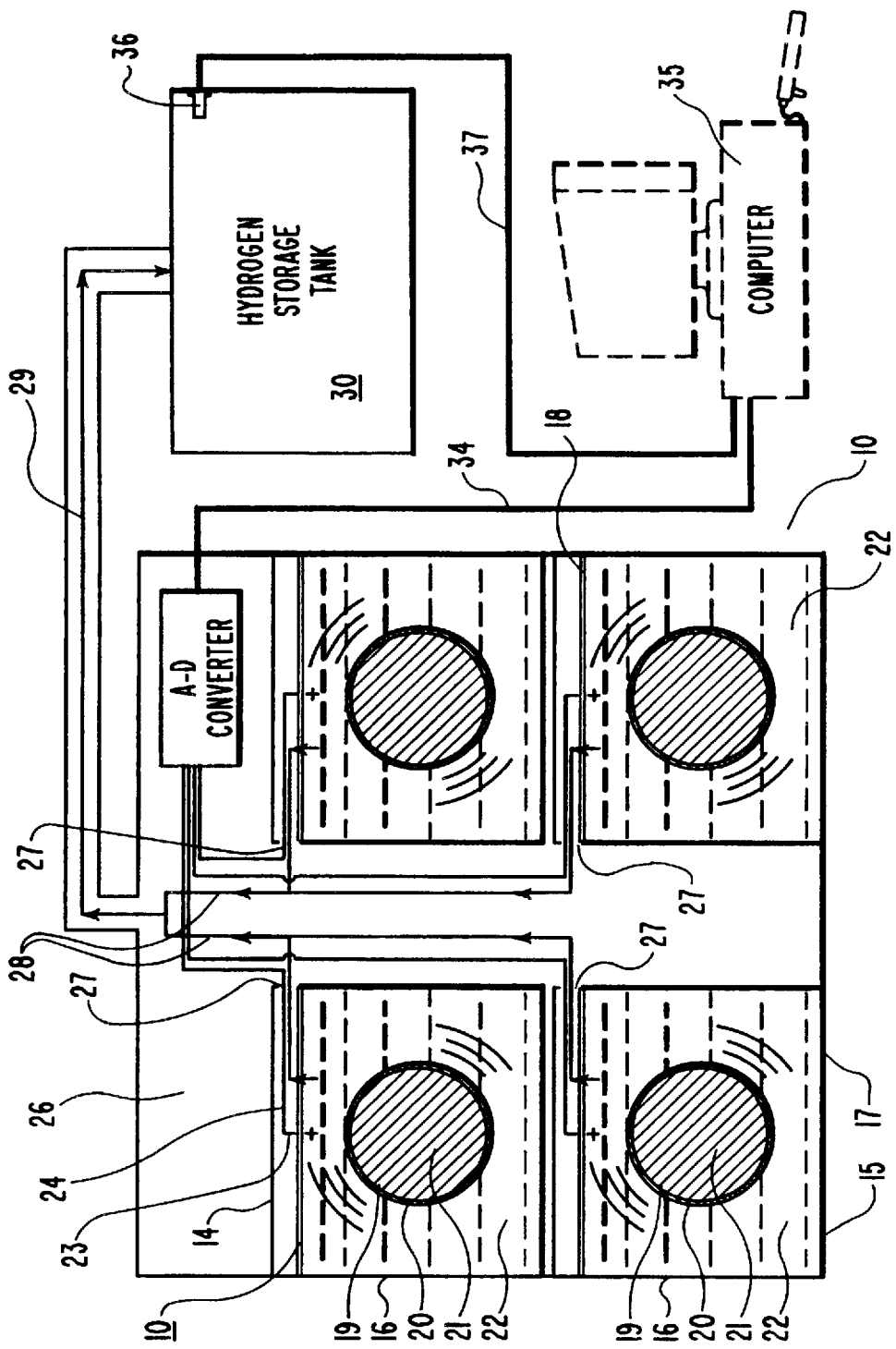
FIG. 4 shows a schematic view of the hydrogen generation system of FIGS. 1 through 3, showing the spherical pellets opened thereacross, exposing their metal cores, showing the system passing hydrogen as it produces into a storage tank, and showing a computer electronically connected to the storage tank and bank of cells for providing system control.

Shown in FIGS. 1 through 4, the individual cells 11 of the bank of cells 10 each contain a pellet 12, that is shown herein as having a spherical shape and is hereinafter referred to as a sphere 12. Each sphere 12 is formed of reactive material, preferably an alkali metal or metal hydride that will chemically react in water to produce hydrogen gas as a product of that reaction. FIGS. 3 and 4 show, respectively, a section of a schematic of the bank 10 of cells 11 containing spheres 12, formed of sodium (Na) 19 whereover an outer covering, coating or shell 20 is formed, with each sphere further shown as containing a center core 21. The shell or coating 20 and core 21, for each sodium sphere 19, are preferably aluminum. The aluminum shell or coating 20 is formed to completely surround the sodium sphere to be impervious to a light salt water solution 22 that is contained within each cell 11. The aluminum shell or coating 20, as set out below, additional to providing a water proof coating, also provides a reactive material for producing hydrogen gas through such hydrogen production is small in comparison to that produced by the chemical reaction of sodium 19 and the aluminum core 21.

The cells 11 of the bank of cells 10 are shown as being individually grounded, with each cell 11, as shown in FIGS. 1, 3 and 4, including a positive electrical contact 23 mounted therein, that is arranged on the end of a wire 24, that is contained between guides 25 in cell 11, as shown best in FIG. 1. In practice, the contact 23 can either be in contact with the sphere 12 surface coating, or, as illustrated in FIGS. 3 and 4, can be maintained in the light salt solution 22. So arranged, the light salt solution on receipt of a voltage through contact 23, sets up a sodium chloride electrolysis to form sodium hydroxide that then attacks the thin aluminum shell or coating 20, disintegrating it, enabling the sodium to chemically react with the water to produce hydrogen gas. The above set out electrolytic reaction of the aluminum coating 20 is described in more detail later herein. While not shown, the sphere 12 can be secured in cell 11, or can be loose within the cell, as shown, within the scope of this disclosure.

As set out above, one aluminum coated sodium sphere 12 is preferably arranged in each cell 11 that also contains the light salt solution, (sodium chloride and water), which solution acts as both an electrical conductor provides for a reaction with the sodium to produce hydrogen as a product of that reaction. Hydrogen gas as is produced is then vented out of an opening in each cell upper corner 27, as shown FIGS. 2 and 3, and in the schematic of FIG. 4, into a section 26 of a bank of cells that is shown to consist of two (2) layers of four (4) cells 11. The produced hydrogen flows to and through a common collecting tube 28 that, in turn, connects into a supply line 29. The supply line 29, as shown in FIG. 4, is connected to pass hydrogen gas as is produced to hydrogen storage tank 30.

For restricting passage of the light salt solution 22 out from an individual cell 11 into the common collecting tube 28, or into another cell or cells 11, as could occur through the cell open upper corner 27, the upper corner opening is closed over by corner 31 of the horizontal spacer or separator 18 that is arranged in the cell above, which corner 31 to thereby function as a flap valve. In practice, hydrogen gas as is generated is under sufficient pressure to lift the horizontal spacer or separator corner 31 off the cell 11 upper corner 27, to provide for venting the hydrogen into the common collecting tube 28. After the hydrogen is vented, the corner 31 will return to its original attitude covering and sealing over the cell upper corner 27 opening, prohibiting a back flow into that cell.

In FIG. 3, the section 26 of the bank of cells 10, is shown as an arrangement of two (2) layers of four (4) cells per a layer, and includes, shown as a block, a processor circuit 32 that incorporates an integrated circuit 32a, or the like. It should, however, be understood that another number and arrangement of cells per layer and/or greater or lesser number of layers can be employed within the scope of this disclosure. The processor circuit 32 is provided for controlling transmission of a voltage to a cell 11, or cells, as is or are selected, and is preferably arranged in a hollow portion of the top section 14. The processor circuit 32 is preferably connected to be under the direction of a computer 35, shown in FIG. 4, and is shown connected thereto through cable 34 and plug 33.

In practice, on command of the computer 35 the processor circuit will operate to pass a current to a selected cell 11 in the section 26 of the bank of cells, ultimately producing hydrogen as a product of a chemical reaction with sodium, aluminum and water. Shown in the schematic of FIG. 4, for determining when the hydrogen in storage tank 30 needs replenishing, a pressure sensor 36 is installed within the tank. The pressure sensor 36 is linked by wire 37 to computer 35 so as to provide to the computer 35 a constant readout of tank pressure. The computer 35 utilizes the tank pressure information to both keep track of tank pressure and for determining a rate of pressure change. This information is used by the computer for selecting the number and location of spheres 12 as are to be reacted to maintain the storage tank pressure above a selected of low pressure, the system preferably operates in a range of pressures of between fifty (50) and one hundred (100) psi. Though, of course, any appropriate pressure range could be selected for system operation within the scope of this disclosure.

Hereinabove has been set out a preferred arrangement of the bank of cell 10 that are shown and described as being made up of individual cells 11 arranged in interconnected sections 26 of bank of cells, with each cell to vent into a common collecting tube 28, and with the collecting tubes connecting to the supply line 29. The invention is not, however, limited to a particular arrangement or cell configuration, and other arrangements or configurations of cells 11, such as a column of side by side cells that vent out of the sides thereof and are contained within a storage tank, or a like configuration, could be employed within the scope of the disclosure.

Further, it should be understood, that, within the scope of this disclosure, any configuration of cells 11 and even an individual cell 11 containing a water or a water and light salt solution and maintaining a single or more non-reactive material coated spherical pellets of a reactive material, such as an alkali metal, metal hydride, or the like, as is used to produce hydrogen gas, will come within the scope of this disclosure. For example, for the invention, a single cell 11 alone could be arranged as the hydrogen generation system of the invention, wherein is contained a measured volume of a light salt solution 22, with the cell containing a pellet 12 and is connected to receive a voltage passed into the light salt solution, forming sodium hydroxide. With the sodium hydroxide, in turn, reacting with so as to break down the coating 20 of pellet 12, to expose the reactive material 19 to the water in solution 22. In that reaction, hydrogen is generated as a product. The residue of such chemical reaction as remains in cell 11 can then be removed, and a new light salt solution 22 and pellet 12 introduced therein and the process repeated.

In practice, the preferred pellet 12 for the first embodiment of a hydrogen generation system of the bank of cells 10, as set out above, is formed as a sphere of sodium material 19 that has received an aluminum coating 20 applied over its outer surface, and preferably includes a center core 21, that is preferably also formed of aluminum. The pellet 12 is shown arranged in cell 11 that also contains a light salt (NaCl) solution that, to generate hydrogen, receives a voltage passed therein setting up an electrolysis. The electrolysis forms sodium hydroxide that attacks and dissolves, in a matter of seconds, the thin protective aluminum shell, layer or coating 20. The sodium material 19 is thereby exposed to the water in solution 22 and a chemical reaction therebetween is established. The exposed sodium freely and rapidly reacts with the cell water, producing gaseous hydrogen and sodium hydroxide. This reaction occurs providing the cell 11 contain a stoichiometrically correct amount of sodium, water and aluminum and assuming the core 21 is also formed of aluminum, then the sodium hydroxide produced from the water-sodium reaction will react with the aluminum core to produce sodium aluminate by the reaction:

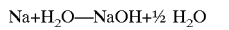

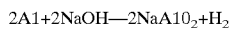

for an over all reaction:

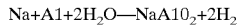

So arranged the three reactants inside cell 11 should react to completion, greatly increasing the hydrogen pressure inside the cell. For a single pellet 12 contained in cell 11 that also contains a proper volume of light salt solution, a volume of hydrogen gas will be produced that is approximately 638 times the volume of the pellet and water for sodium (Na) as the reactant material 19. Sodium (Na), as set out herein, is the preferred reactive material 19. It should, however, be understood that another alkali metal or metal hydride could be so used as the reactive material 19 within the scope of this disclosure. For example, where lithium aluminum hydride LIAlH$_4$ is selected as the reactant material 19, a volume of hydrogen gas will be produced that is approximately 1150 times the volume of the pellet and water.

Figure 5:
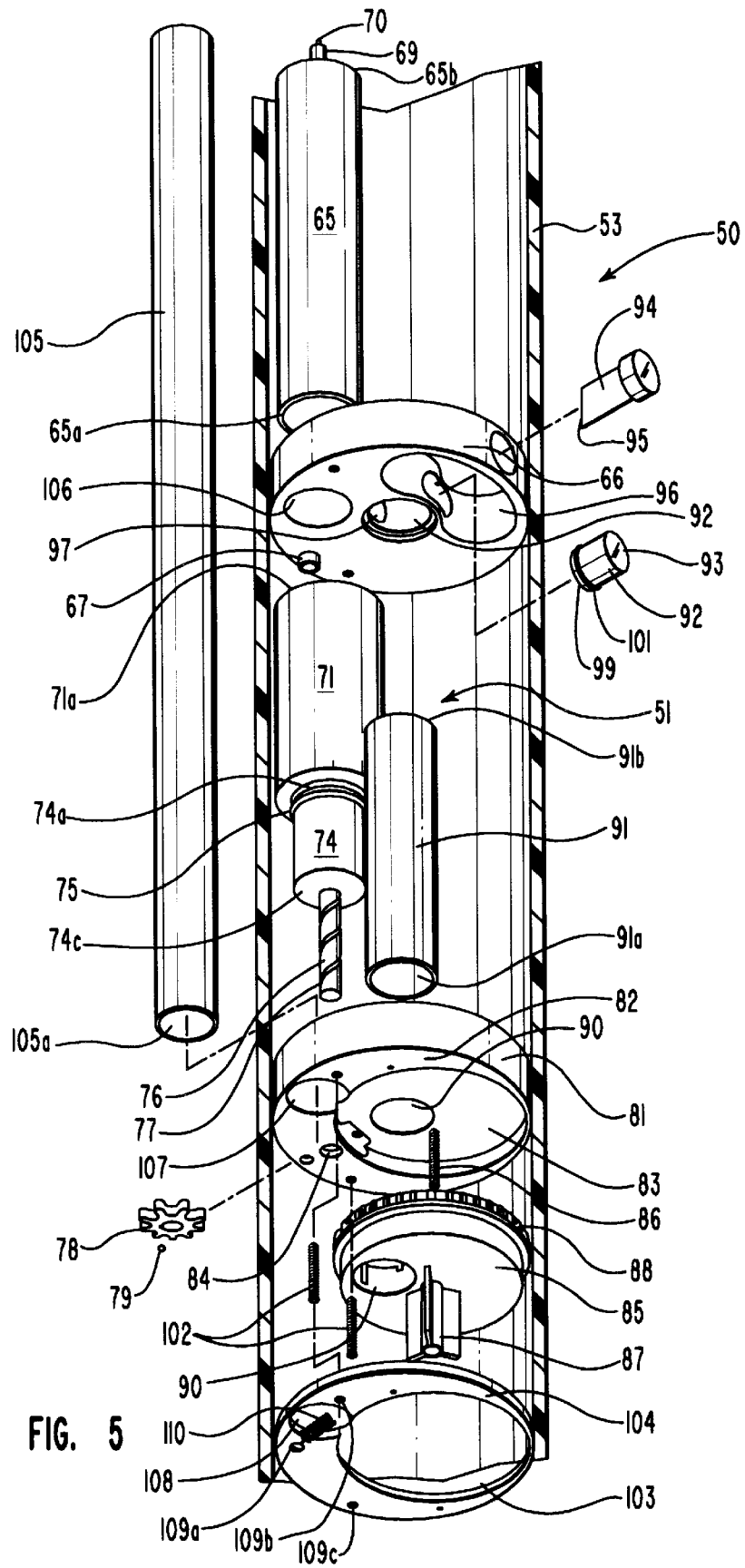
FIG. 5 shows an exploded profile perspective view of another or second embodiment of a hydrogen generation system of the invention shown fitted into a cylindrical vessel or tank, and including a straight open tube as a spherical pellet loading arrangement to feed spherical pellets of the invention into the vessel or container.
Figure 6:
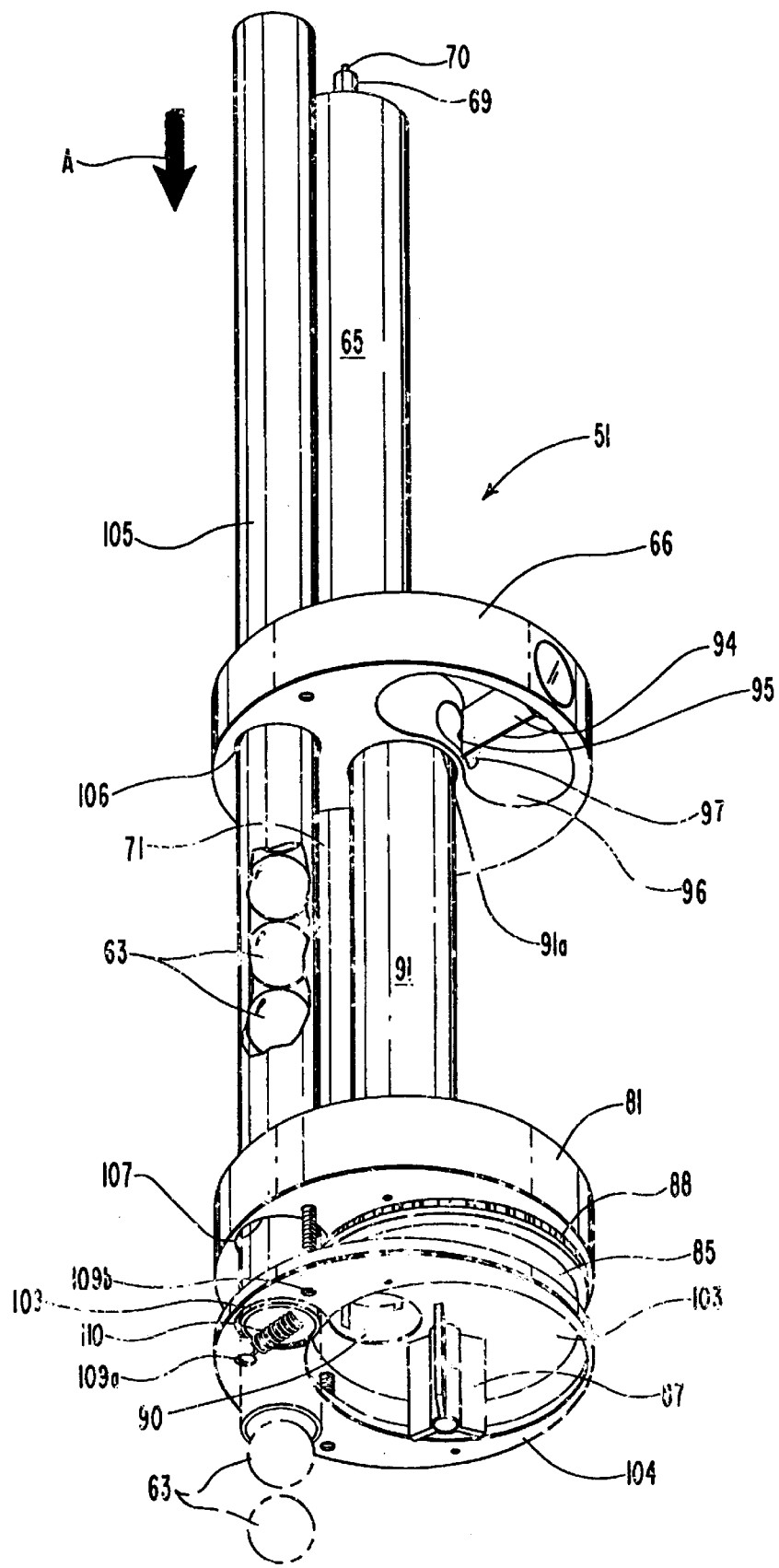
FIG. 6 shows an assembled profile perspective view of the hydrogen generation system of FIG. 5. showing the tube fitted through the system and past, a spring barrier for passing the spherical pellets therethrough, shown in broken lines, and into the vessel or tank.
Figure 7:
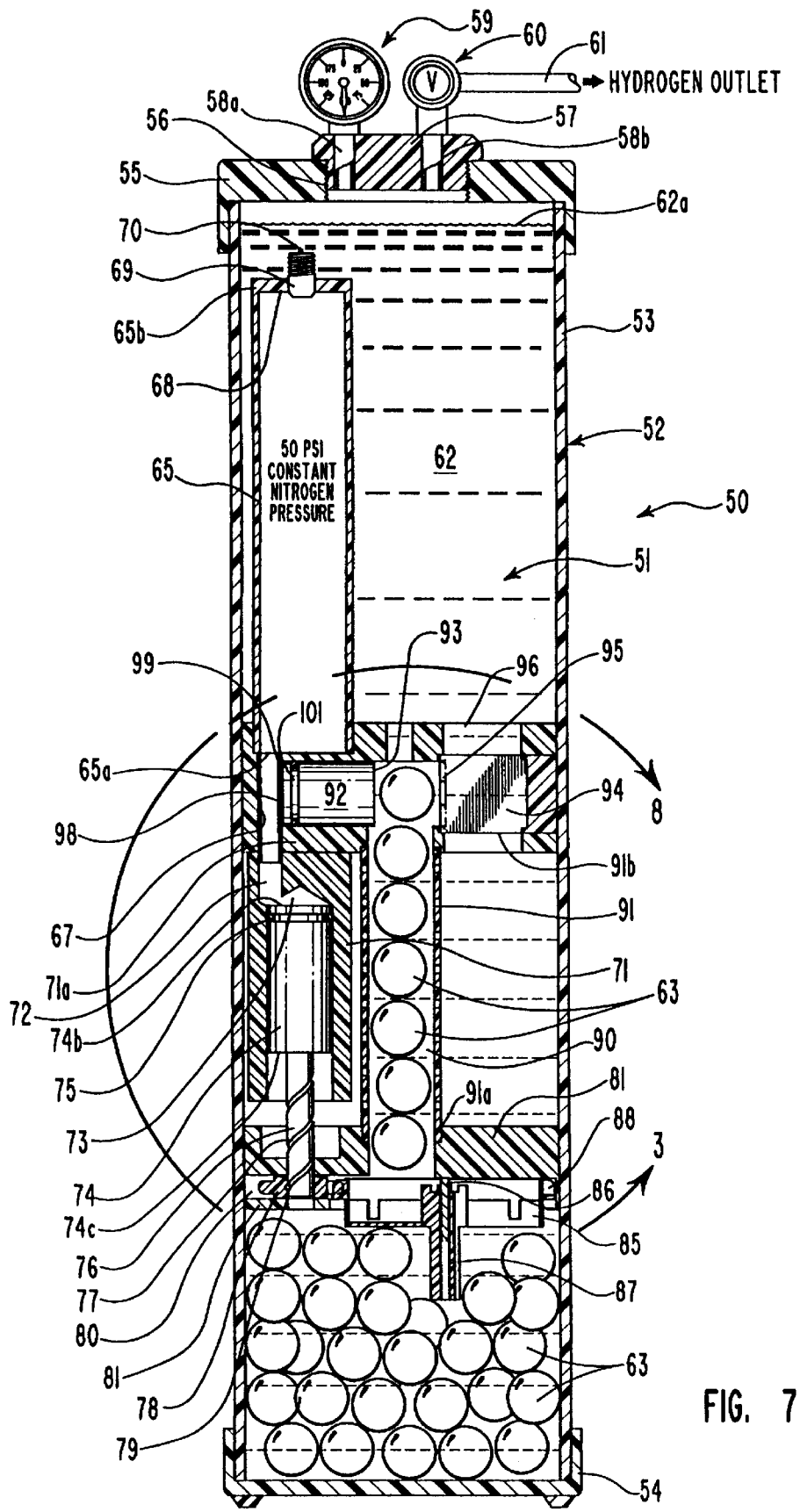
FIG. 7 shows a profile longitudinal sectional view of the vessel or tank with the assembled hydrogen generation system of FIGS. 5 and 6 fitted therein, showing the vessel or tank filled with water and with a number of spherical pellets shown essentially filling the bottom of the vessel or tank, with a column of the spherical pellets shown floating upwardly in a feed tube, and showing a top spherical pellet shown aligned with a reactor piston that is operated to drive a spherical pellet into a fixed reactor blade.

FIGS. 5 and 7 through 9 show a second embodiment of a hydrogen generation system 50 that includes a hydrogen generator 51, as an exploded apart assembly, as shown in FIG. 6, with that assembly installed in a cylindrical housing 52 shown in FIGS. 5 and 7 through 9. The cylindrical housing 52, as shown best in FIG. 7, is an open tube 53 with a bottom cover 54 secured across a lower or bottom end thereof, and a top cover 55 arranged for closing over the cylinder top end, in sealing engagement therewith and may be removable for fitting the hydrogen generator 51 therein. The top cover 55, as shown, includes a center hole that is threaded at 56 to accommodate a threaded plug 57 turned therein. The plug, as shown includes ports 58$a$ and 58$b$ that are each threaded to each receive a threaded stem of, respectively, a conventional pressure gauge 59 and a valve 60. The valve 60, as shown, connects to a line 61 that is a hydrogen outlet line. So arranged, the pressure of hydrogen gas within the cylindrical housing 52 can be read out by observing needle positioning over a scale of the pressure gauge 59 and, as needed, the valve 60 can be operated to pass hydrogen from the cylindrical housing and into the line 61. The line 61, in turn, can connect to provide hydrogen as a fuel to an internal combustion engine, fuel cell, or the like, as desired, within the scope of this disclosure.

Figure 8:
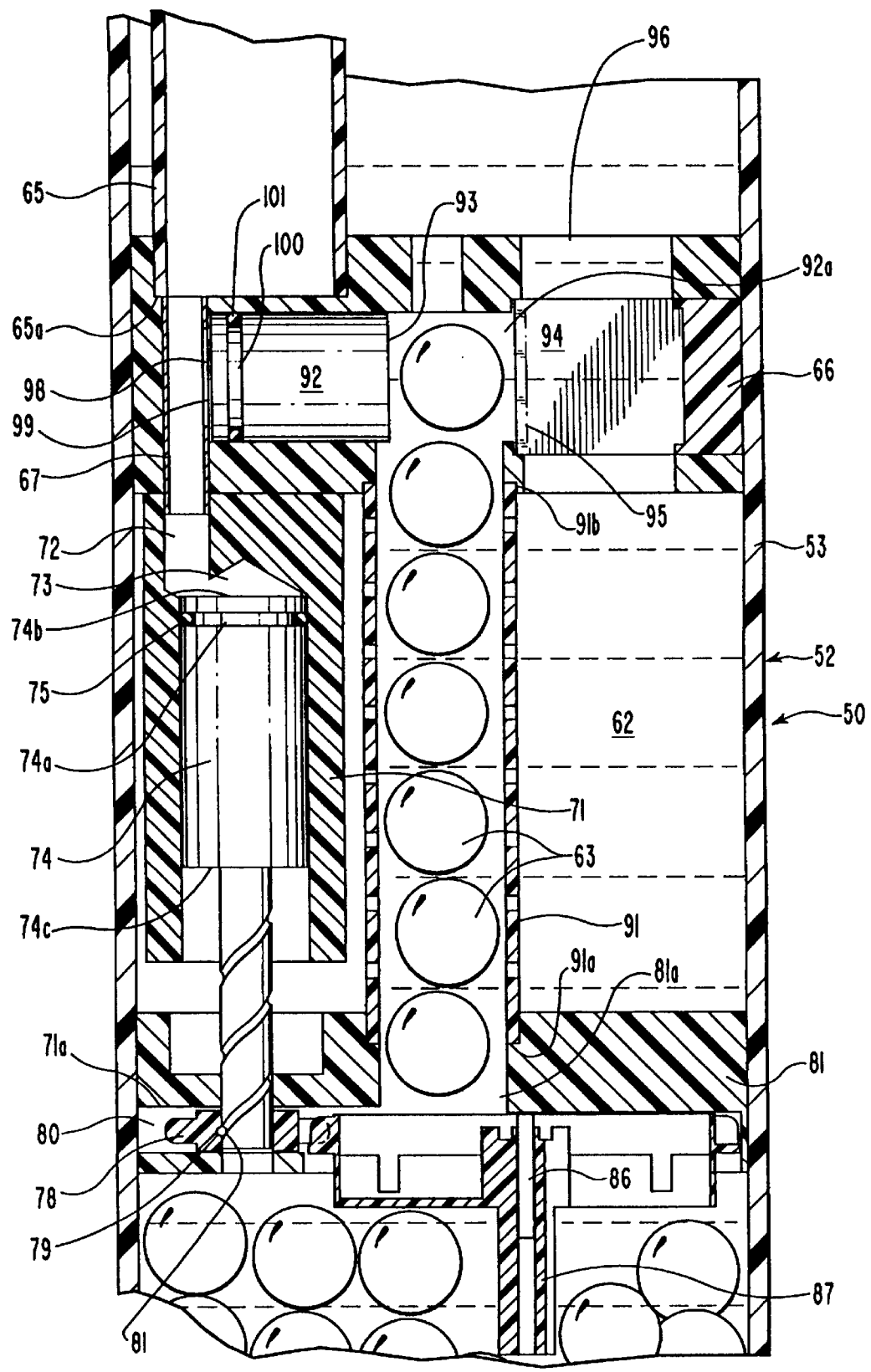
FIG. 8 shows an enlarged sectional view taken within the line 7—7 of FIG. 6.
Figure 9:
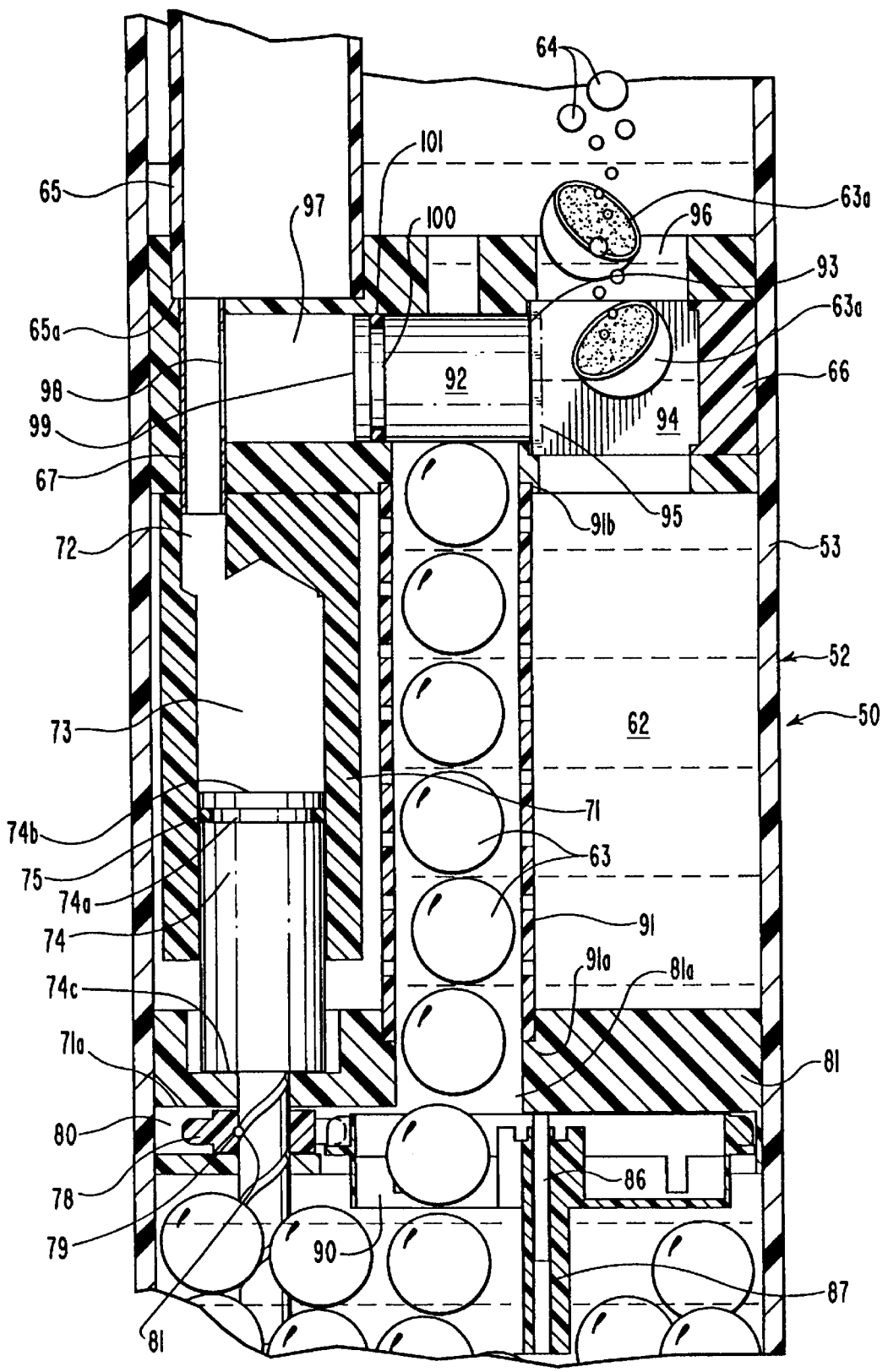
FIG. 9 shows the view of FIG. 8 after the reactor piston has extended to drive the spherical pellet into the reactor blade, cutting the spherical pellet in half, with the pellet halves shown floating upwardly in the water, and showing bubbles being emitted from the pellet exposed core surfaces indicative of presence of a chemical reaction producing hydrogen gas.

Shown in FIGS. 5 and 7 through 9, the cylindrical housing 52 contains a volume of water 62 therein to cover the hydrogen generator 51 fitted therein, and includes a number of spherical pellets 63 that are contained beneath a base plate 81 of the hydrogen generator that will float in water to both rise in a feed tube 91 of the hydrogen generator and, when discharged therefrom, will rise through the water to the surface, as illustrated in FIG. 9 and as described above, the pellet core material will react with the water, illustrated by bubbles 64, producing free hydrogen gas and with sodium hydroxide remaining in solution in the water 62, set out in the formula below:

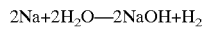

Shown in the exploded view of FIG. 5, and FIGS. 6 through 9, the hydrogen generator 51 includes a static pressure source that is shown as a cylinder 65 that is mounted across its lower end to a top plate 66 that is ported therethrough, shown as an open tube 67. A top end 65$b$, of cylinder 65, shown best in FIG. 7, includes a disk 68 secured thereover that mounts a valve stem 69 that includes a valve 70 fitted therein, shown also in FIGS. 5 and 6, that can be a conventional pneumatic tire and tube valve, or the like, and is arranged to provide for a repressurization of the static pressure source, as needed. A pressure chamber 71, shown as a cylinder is secured at a top end 71$a$ across an undersurface of the top plate 66 such that a pressure port 72, shown in FIGS. 7 through 9, is in communication with the open tube 67, with the pressure port 72 opening into a pressure chamber 73 wherein a cam operating piston 74 is fitted. The cam operating piston 74 includes at least one sealing ring 75 fitted in a circumferential groove 74$a$ formed therearound, the sealing ring for engaging and sealing against the pressure chamber 73 wall as the piston is moved up and down therein, as described below.

So arranged, a top surface or dome 74$b$ of the cam operating piston 74 is under pressure from the static pressure source, contained in pressure chamber 71, with an operating piston undersurface 74$c$ open to the water 62 contained in the cylindrical housing 52. So arranged, when the pressure in the pressure chamber 71 is greater than the pressure exerted by the hydrogen gas on the water level 62$a$, shown in FIG. 7, in the cylindrical housing, the operating piston 74 will be forced downwardly. Whereafter, as hydrogen is generated to increase pressure above the water level, that gas pressure will act through the water 62 to urge the operating piston 74 upwardly, with the piston traveling between the positions shown in FIGS. 8 and 9.

A cam rod 76 is shown in FIGS. 5 and 7 through 9, secured to extend axially, at a right angle, from the center of the undersurface of the operating piston undersurface 74c. The cam rod 76 includes a cam track 77, shown as a helix groove that is formed therearound and wherein a follower ball 79 of a follower gear 78 is fitted to roll. So arranged, the follower gear 78 is journaled to turn on the cam rod 76 and is maintained within a cavity 80 between an inner or lower surface of a bottom plate 81 and the bottom surface 71a pressure chamber 71 as the follower ball 79 travels along the cam track 77.

Shown best in FIG. 5, a carousel dispenser disk 85 is provided that is fitted into a depression 83 formed in an undersurface 82 of the bottom plate 81. The carousel dispenser disk 85 is axially mounted onto a pin 86 that extends from the center of depression 83 and includes a nut 87 arranged to be turned onto the pin 86 to journal the carousel dispenser disk 85 to turn in depression 83. Teeth 89 are formed around an outer circumference of the carousel dispenser disk 85 that are to engage and mesh with the teeth 78a of the follower gear 78. The follow gear, as set out above, is fitted to the cam rod 76 to travel therealong as the ball 79 travels in the cam track 77, thereby turning the follower gear 78. Which follower gear, in turn, turns the carousel dispenser disk 85. So arranged, a hole 90 that is formed in the carousel dispenser disk 85, that contains a spherical pellet 63, when the cam rod 76 is moved to the attitude shown in FIG. 9, aligns with hole 81a through the bottom plate 81. The hole 81a, in turn, aligns with and is the same diameter as a bottom end 91a of a feed tube 91. With the hole 81a and tube end 91a aligned, the spherical pellet 63 will float upwardly through the feed tube 91 and out from a top end 91b thereof and into a reactor chamber 92a, as shown in FIG. 8. So arranged, an individual spherical pellet 63 is positioned, as shown best in FIG. 8, between a face 93 of a reactor piston 92 and a sharp edge 95 of a fixed flat reactor blade 94.

Shown in FIG. 9, the reactor piston 92 has been extended into reactor chamber 92a, urging the spherical pellet 63 therein against the sharp edge 95 of the reactor blade 94 to cut the pellet in half. The two pellet halves to then float out of an opening 96 formed through the top plate 66, above the reactor blade 94. The pellet halves are with bubbles 64 being emitted from the pellet material surface, which bubbles represent formation of hydrogen gas from a chemical reaction of the pellet core material with water, as set out above.

To provide for operation of the reactor piston 92, to extend out from a chamber 97 with the piston face 93 striking contacting the spherical pellet 63, as shown in FIG. 9, an opening 98 is provided through the side of open tube 67. A rear surface 99 of the reactor piston 92 is thereby exposed to the static pressure source contained in cylinder 65. To maintain the pressure in cylinder 65, the reactor piston 92, like the operating piston 74, includes at least one groove 100 formed therearound wherein a sealing ring 101 is positioned. Though, of course, additional grooves and sealing rings can be included to provide additional sealing, as desired.

In operation, to provide the travel of the operating piston 74 and guillotine piston 92, as described above, both piston faces 74b and 99, respectively, are open to the static pressure source contained in cylinder 65. Provided the hydrogen gas pressure in the cylindrical housing 52 above a surface 62a of water 62 is greater than the pressure of the static pressure source. The hydrogen gas pressure acting through water 62 on the operating piston face 74c and reactor piston face 93 maintains the pistons 74 and 92, respectively, in the positions shown in FIGS. 7 and 8. When, however, hydrogen gas has been vented from the cylindrical housing 52, as through hydrogen outlet 61, and the gas pressure is below that of the static pressure in cylinder 65, that static pressure acts on the pistons 74 and 92, as describe above, to move them to the positions shown in FIG. 9. The travel of the reactor piston 92 to split a spherical pellet 63, as shown, to generate additional hydrogen. With the operating piston 74 travel to turn the carousel dispenser disk 85 so as to align hole 90 therethrough with the bottom plate hole 81a and the open bottom end 91a of the feed tube 91, opening the bottom portion of the cylindrical housing 52 to the spherical pellets 63 maintained therein. So arranged, the spherical pellets are free to float upwardly through the water filled hole 90 and feed tube 91, with a top spherical pellet aligning with the reactor piston 92. Thereafter, as hydrogen is generated by the chemical reaction of the spherical pellet core with water, the pressure above the water level will exceed that of the static pressure source, causing the respective pistons 74 and 92 to retract to the attitudes shown in FIGS. 7 and 8. In which piston retraction, the reactor chamber 92a is opened to receive a top spherical pellet 63 in the column contained in the feed tube 91, and the carrousel dispensing disk will be rotated back to its position shown in FIGS. 7 and 8 by turning of the follower gear 78 as the cam rod 76 is pulled back therethrough. Turning of the carrousel dispensing disk 85 moves the hole 90 out of alignment with the bottom plate hole 81a and feed tube 91 end 91a, and captures a spherical pellet 63 in that hole 90 that floats to the bottom of the column of pellets 63 when the top pellet floats into the reactor chamber 92a, as shown.

As set out above, the bottom portion or section of the cylindrical housing 52, that contains a supply of spherical pellets 63, is open to replenish the supply in feed tube 91 as hydrogen flows out through the hydrogen outlet line 61. A demand system is thereby provided that will continue to operate, maintaining hydrogen gas under low pressure of from, approximately, a high pressure of approximately one hundred (100) psi to below the pressure of the static pressure source of approximately fifty (50) psi. Allowing therefore, for a use of light weight inexpensive materials to be used for the cylindrical housing 52 to safely contain the generated hydrogen gas for use, on demand, as a fuel.

After the spherical pellets 63 are used and any remaining hydrogen vented, the threaded plug 57 can be removed and the water containing sodium hydroxide and the spherical pellet 63 coverings can be removed therefrom to be replaced with fresh water 62. At this time, as required, the static pressure source contained in cylinder 65 can be restored by passing a gas, that is preferably an inert gas such as nitrogen, under pressure, through the valve 70. To refill the cylindrical container 52 bottom portion with spherical pellets 63, an end of a straight refilling tube 105, shown in FIGS. 5 and 6, is passed into the cylindrical container through the center hole 56 and fitted through hole 106 through the top plate 66, through hole 107 formed through bottom plate 81 and through a hole 108 formed through a bottom cover 104. Which bottom cover includes a wide opening 103 wherein the carousel dispensing disk 85 is fitted, with bolts 102, shown in the exploded view of FIG. 5, for turning through bottom cover holes 109b and 109c and into tapped holes formed in the undersurface of the bottom plate 81.

For restricting spherical pellets 63 from reentering and floating upwardly through the hole 108 and into the area above the bottom plate 81 to be lost as fuel sources, the hole 108 preferably includes a flexible coil spring 110, or like barrier, that is connected at its ends in holes 109a and 109b to bottom plate 81 to extend across the hole 108. In practice, the spring 110, upon being contacted by the refilling tube 105 end 105a, is pushed aside by that end of the refilling tube, stretching the spring to the attitude shown in FIG. 6. Whereafter, spherical pellets 63 are passed through the refilling tube 105, filling the area below the bottom plate 81 and bottom cover 103, as shown best in FIG. 7.

Figure 10:
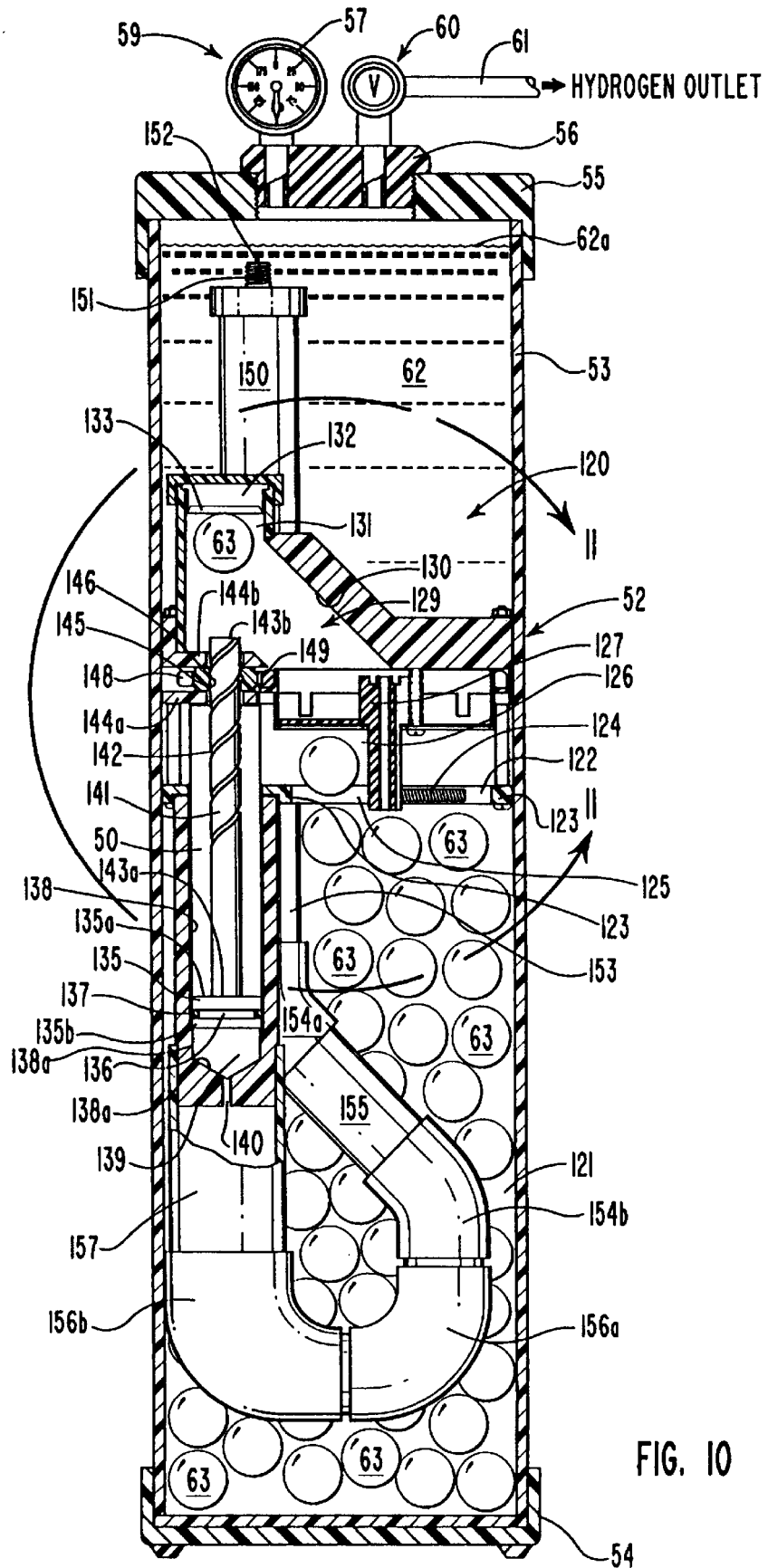
FIG. 10 shows a view like FIG. 7 of still another or third embodiment of a hydrogen generation system of the invention contained in a cylindrical tank or vessel.
Figure 11:
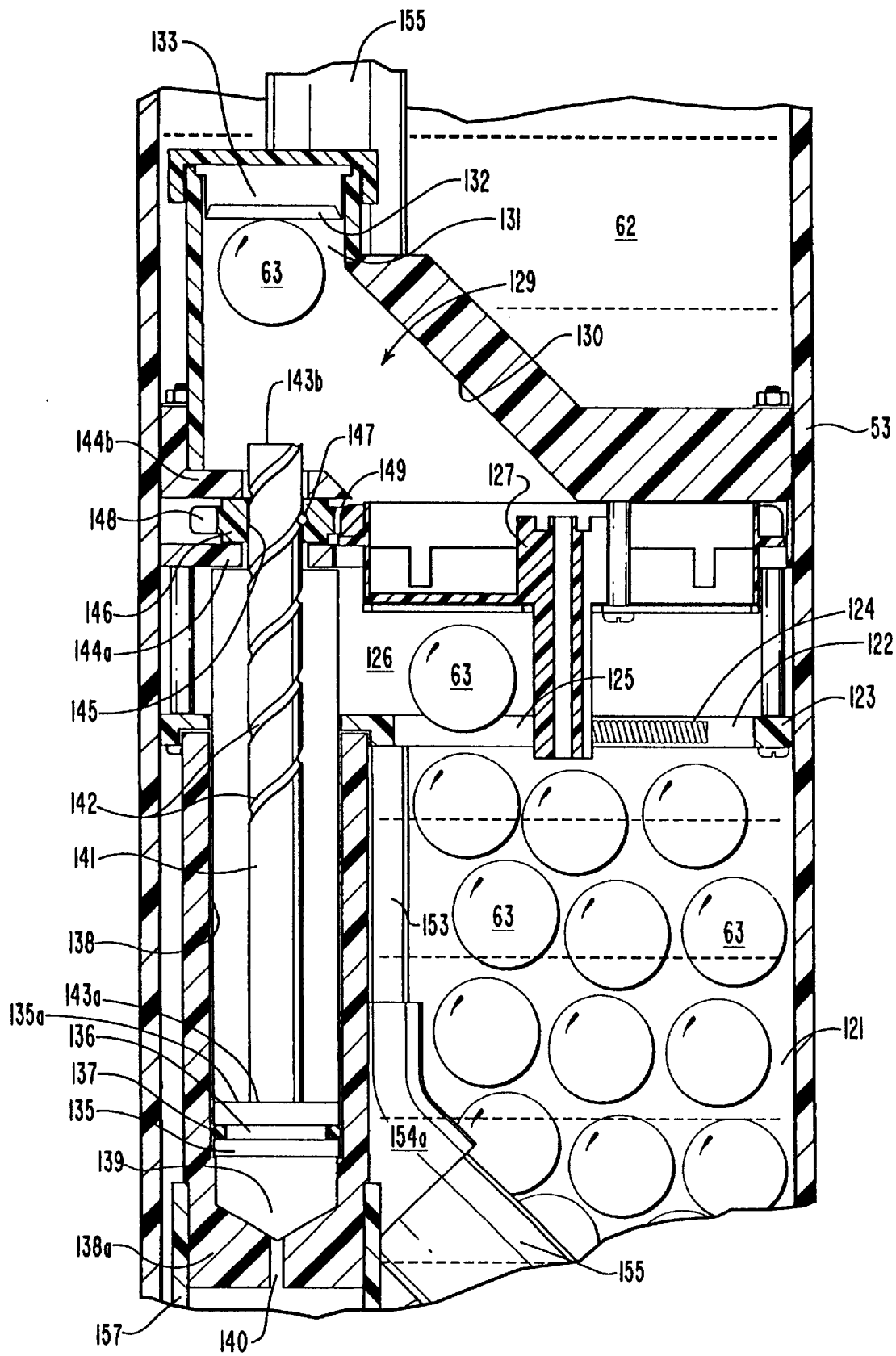
FIG. 11 shows an enlarged sectional view taken with the line 11—11 of FIG. 10.
Figure 12:
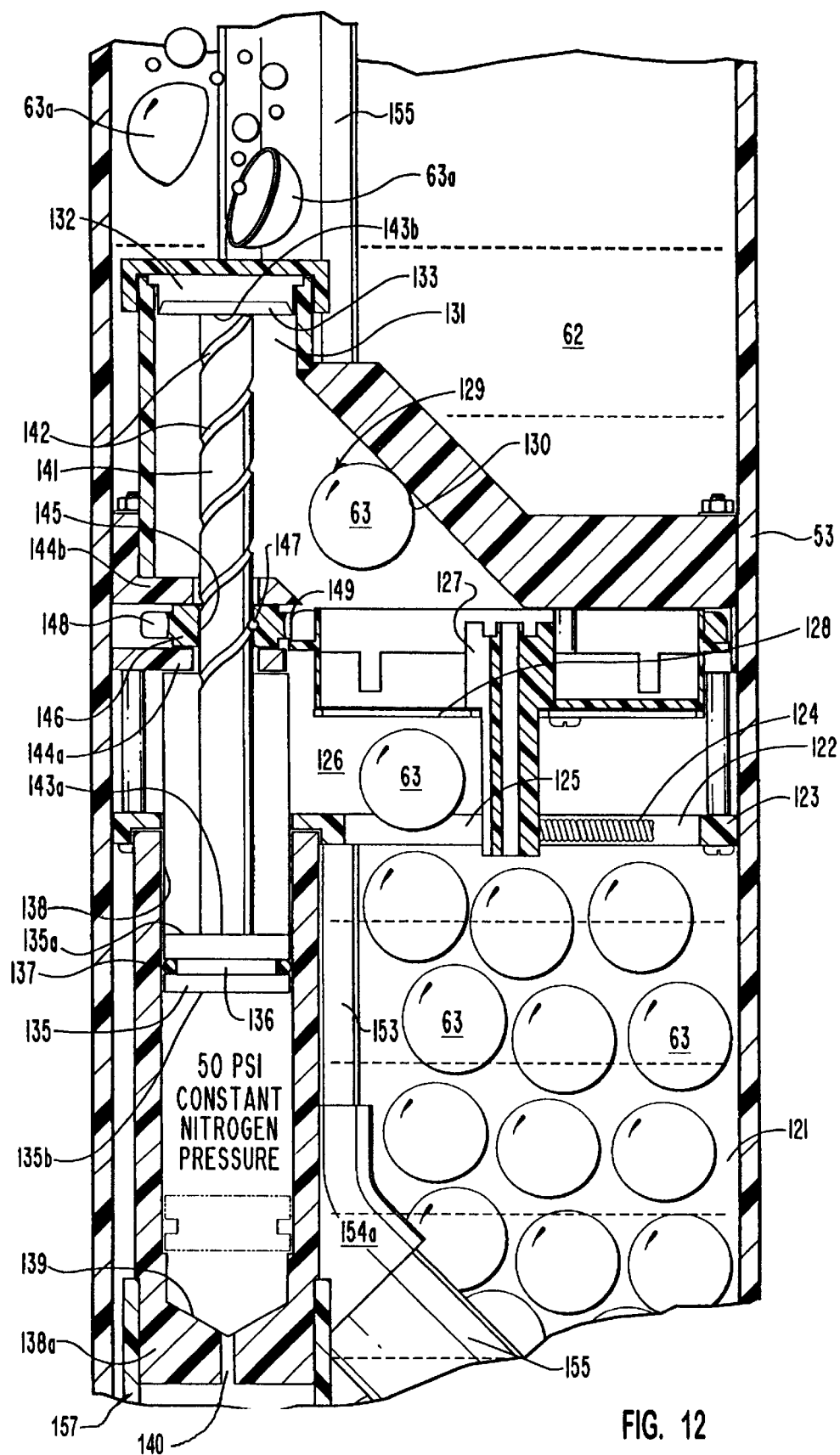
FIG. 12 shows the view of FIG. 11 with a pellet shown as having been split and reacting with water as shown in FIG. 9.

Another or third embodiment of the present invention in a hydrogen generation system 120 is shown in FIGS. 10 through 12, that is for installation in cylindrical housing 52. Though, it should be understood, another vessel arrangement could be so used within the scope of this disclosure. The cylindrical housing 52 of this embodiment also includes an open tube 53 with bottom and top covers 54 and 55, respectively, with the top cover 55 shown as including the threaded a hole 56 wherein a threaded plug 57 is turned. Like the embodiment 51, the threaded plug 57, of this embodiment includes the pressure gauge 59 and valve 60 that connects to pass hydrogen gas into a hydrogen outlet line 61.

Like the second embodiment, the cylindrical housing 52 of the hydrogen generation system 120 preferably includes a bottom section or portion 121 that contains spherical pellets 63, like those described above, that are passed therein through a refilling tube, not shown, which filling tube is like the refilling tube 105 and is passed through a hole 122, formed through a bottom divider 123, and stretches aside a spring 124. Filling of the cylindrical housing bottom portion 121 with spherical pellets 63 is accomplished with the plug 57 removed whereafter the spherical pellets 63 are poured through the refilling tube.

The bottom divider 123 includes an inlet hole 125 wherethrough a spherical pellet 63 is shown as having floated upwardly into an inlet chamber 126 located below a carousel dispenser disk 127. The carousel dispenser disk 127 is also for restricting passage of a spherical pellet 63 therethrough and is essentially like the carousel dispenser disk 85 as was described above and shown in FIGS. 10 and 11 and will not be further described herein. FIG. 12 shows the carousel dispenser disk 127 as having turned to align a hole or opening 128 therethrough that a pellet 63 has floated through, and into a reactor passage 129. For channeling each special pellet to a reactor chamber 131, the reactor passage 129 includes an inwardly sloping upper wall 130 that the spherical pellet 63 will strike and slide upwardly along to be directed into reactor chamber 131. The reactor chamber 131 includes a reactor blade 132 fitted thereacross, that has a sharp edge 133 to engage spherical pellet 63.

The hydrogen generator system 120, as shown in FIGS. 10 through 12, preferably includes a single reactor piston 135 that has at least one groove 136 formed therearound wherein is maintained a sealing ring 137. The reactor piston is maintained to travel up and down in a sleeve 138 that is open to the inlet chamber 126 and contains the vessel water 62. Accordingly, an upper surface 135a of reactor piston is under pressure from a gas pressure that is exerted on the top 62a of water 62, as shown in FIG. 10.

Shown in FIGS. 10 through 12, a rod 141 that includes a helix track 142 formed therealong, is axially secured at its end 143a to the reactor piston upper surface 135a. An upper rod end portion is fitted to slide through aligned holes formed through spaced apart parallel plates 144a and 144b and through a hub opening 145 in a follower gear 146. The follower gear 146 is like and, it should be understood, functions like the follower gear 78 and, like follower gear 78, includes a ball 147 maintained in a hole formed as a seat in the wall of hub opening 145 that is fitted to travel along the helix track 142. The follower gear 146 includes teeth 148 formed around its outer circumference that are in meshing engagement with teeth 149 that are formed around the outer circumference of the carousel dispenser disk 127. So arranged, as rod 141 travels up and down through hole 145 of the follower gear 146, causing the follower gear teeth 148 to turn the teeth 149 of the carousel dispenser disk 127, as set out above, the carousel dispenser disk turning to pass at least one spherical pellet 63 into the reactor passage 129. Upward travel of the rod 141 moves a top end 143b thereof between the attitude shown in FIGS. 10 and 11 to the attitude shown in FIG. 12. In FIG. 12 the rod 141 top end 143b is shown engaging the sharp edge 133 or reactor blade 132. In which rod 141 travel, with a spherical pellet 63 positioned in the reactor chamber 131, the rod top end 143b will engage and force the spherical pellet 63 into the reactor blade 132 sharp edge 133, splitting the pellet in two, shown as pellet halves 63a. The core material of the pellet 63 halves 63a reacts with the water 62, giving off hydrogen gas, shown as bubbles, as the product of the reaction. Which bubbles float to the water surface 62a, pressurizing the area of the vessel thereabove.

The hydrogen generation system 120 of this embodiment, like the hydrogen generation system 51 set out above, is operated when the hydrogen gas pressure above the level 62a of water 62 falls below the pressure of a static pressure source, shown in FIG. 10 as a cylinder 150 to generate hydrogen gas by splitting a spherical pellet 63 in half, shown as halves 63a in FIG. 12. The cylinder 150 is identified as containing nitrogen gas at a pressure of fifty (50) PSI. To fill the cylinder 150, a threaded stem 151 is shown in FIG. 10 extending out of a top end thereof that includes a valve 152 that may be a bicycle tube valve, or the like, for use in filling or refilling the cylinder when the vessel 52 plug 57 is removed.

In the system 120 embodiment, the static pressure source is open to pressurize a bottom face 135b of the reactor piston 135 so as to move that piston to the attitude shown in FIG. 12 when the hydrogen gas pressure exerted on the piston top face 135a is less than that of the static pressure source that is contained in cylinder 150. To provide for which opening, the reactor piston sleeve 138 is closed at a bottom end 138a forming an open area 139, with the bottom end 138a including an opening 140 formed therethrough. The sleeve bottom end receives an end of a pipe 157 secured thereover. The pipe 157 is one end of a series of connected pipes that couple together to connect to and extend from a bottom end of the cylinder 150 to transfer pressure therethrough. The pipes, as shown in FIGS. 10 and 11, to include a first straight pipe 153 that extends from the cylinder 150 end and connects to an angle fitting 154a that, in turn, as shown best in FIG. 10, connects to a straight pipe 155 that, in turn connects to another angle fitting 154b. The angle fitting 154b, in turn, connect to a pair of ninety (90) degree elbows 156a and 156b that, in turn, connect to a bottom end of the pipe 157. The pipes 153 through 157 are preferably plastic for providing a convenient easily assembled plumbing arrangement for connecting the static pressure source contained in cylinder 150 to the sleeve 138 bottom end below the reactor piston 135.

In practice, the cylinder 150 static pressure is initially overcome by pressurizing the vessel above the water level 62a as by introducing a back pressure through the hydrogen outlet line 61, preferably utilizing an inert gas such as nitrogen. The reactor piston 135 will thereby be moved and the carousel dispenser disk 127 turned to the attitudes shown in FIGS. 10 and 11. Whereafter, as the system is vented out through the hydrogen outlet line 61, the pressure in cylinder 150 will come to exceed that gas pressure above the water level 62a. Thereat, the reactor piston 135 will be moved to the attitude shown in FIG. 12, splitting a spherical pellet 63 to open its core material to water 62 and react therewith to form hydrogen to pressurize the vessel above the water level, resetting the system to the attitude shown in FIGS. 10 and 11. Accordingly, as hydrogen gas is discharged through the hydrogen outlet 61, the system will operate to renew the hydrogen gas pressure in the vessel 52 until all the spherical pellets 63 have all been split and reacted. Whereafter, the system must be recharged.

While not shown, it should be understood that the above set out embodiments of the hydrogen generation systems of the invention can be used to augment and/or replenish other hydrogen sources, including highly pressurized sources as have been produced by electrolysis, by a solar array, or the like, within the scope of this disclosure.

The hydrogen generation systems of the invention, as discussed above, lend themselves to use as a truly portable systems suitable for replenishing, on demand, a low pressure storage tank with hydrogen to maintain tank pressure within a low pressure range of, for example, from 50 to 100 psi. Such storage tank can therefore be formed of thin gauge thin steel sheet material, or the like, that is light in weight and would therefore be suitable for use as a fuel system for an internal combustion engine, portable fuel cell, or the like. With, for such use, the systems of the invention can be arranged to be easily removable and replaceable.

Pellets 12 are herein shown as set out above, are preferably consisting of a section of sodium (Na) 19 that is preferably spherical but may be any appropriate shape, and is coated with a thin aluminum shell or coating 20 and preferably but not necessarily includes an aluminum center core 21, for use as a fuel for generating hydrogen gas in bank of cells 10. With, in the second and third embodiments of the hydrogen generation systems 51 and 120, as set out above, the spherical pellets 63 are likewise formed of sodium (Na) but are coated with a water impervious material such as high density polyethylene, or the like, as by dipping, spraying, or other appropriate process, whereby the pellet outer surface is completely covered. The preferred coating or covering is non brittle and resists cracking or tearing and provides a water proof coating thereover. Such coating, while it must completely cover the pellet material, should be thin enough to be easily cut by forcing the pellet into a blade, or the like, as set out and described above. In practice, a coating thickness of as little as 0.020 of an inch has been used successfully.

Sodium is preferred for use as the reactive material in spherical pellets 63 and sodium and aluminum as is preferably incorporated in the pellets 12, are, or course, abundant and readily available commercially in large quantities. Sodium represents approximately 2.6% of the earth's crust, and aluminum compounds make up more than 15% Neither metal is ever found free in nature, however, and both require energy to produce. As compared to other suitable materials such as lithium aluminum hydride coated with aluminum, that, as was set out hereinabove, is another suitable material, they are cheaper and are accordingly preferred. The aluminum thin shell or coating can be formed by a conventional manufacture, receiving sodium poured therein. It is, however, preferred to coat the sodium sphere, that already contains a solid aluminum core, with a thin coating of approximately one ten thousandth (0.001) of an inch by plating the aluminum thereon, as in an organic electrolyte, or by plating with aluminum in a vacuum. In such plating, the aluminum may be vaporized utilizing a tungsten wire, with the sodium spheres rotated in the "line of sight" to the vapor stream, to receive the aluminum coating, or other appropriate process can be used. The present invention, it should be understood, is not limited to a particular process of manufacture of the coating on the reactive material spheres or any specific thickness of aluminum coating.

The described pellet 63 for use for generating hydrogen gas in the second and third embodiments of hydrogen generation systems 51 and 120 of the invention is also coated to be water impervious, but for that coating utilizes a plastic or plastic like material, such as, but not limited to, a high density polyethylene plastic, that can be sprayed, dipped, or otherwise coated over the pellet surface that is preferably spherical but may be any convenient shape, within the scope of this disclosure.

Preferred embodiments of my invention in systems for generating hydrogen on demand, the pellets of a reactive material, such as sodium, for reacting to form sodium, and their use have been shown and described herein. It should, however be apparent that this disclosure is made by way of example only and that variations and modification to the described apparatus and pellets their use are possible within the scope of this disclosure without departing from the subject matter coming within the scope of the following claims and a reasonable equivalency thereof, which claims I regard as my invention.

I claim:

1. A hydrogen generation system comprising, a water containing vessel for receiving components of the hydrogen generation system, including a cap means for providing vessel closure and access and for removing sodium hydroxide by products, changing the liquid and adding water and at least one pellet and including valve means for venting hydrogen from said vessel; a reactor chamber means for maintaining at least one pellet of a material that is reactive in water to produce hydrogen gas which said pellet is coated with a water impervious coating, and means arranged in said water containing vessel for opening said pellet coat, exposing said pellet reactive material to react with water in said vessel generating hydrogen gas.

2. A hydrogen generation system is recited in claim 1, wherein the reactor chamber means is a hollow cell having a vent opening and includes an electrical contact means for supplying an electrical current to a light salt and water solution contained in said vessel; the pellet reactive material is coated with a metal that is non-reactive in said light salt and water solution and will chemically react to expose the pellet material when a current is introduced into said light salt and water solution, exposing said pellet reactive material to the said light salt and water solution that reacts therewith to form hydrogen gas; and means for controlling passage of said electrical current to said electrical contact means.

3. A hydrogen generation system as recited in claim 2, wherein the hollow cell is one of a bank of cells that each contain the light salt and water solution, have an electrical connector means in contact with said solution, with each said cell arranged to contain the coated pellet and has a vent opening to pass hydrogen to the valve means responsive to a presence of hydrogen gas under pressure in said cell.

4. A hydrogen generation system as recited in claim 2, wherein the pellet is coated aluminum to a thickness of approximately one thousandth (0.001) of an inch.

5. A hydrogen generation system as recited in claim 2, further including a hydrogen storage tank means arranged to receive hydrogen gas from a reaction of the pellet reactive material, computer means as the means for controlling passage of a current to the electrical contact means operated upon a sensing a decrease in pressure in said hydrogen storage tank means and selects a particular cell to pass the electrical current thereto, to open the pellet therein, whereafter the material of said pellet reacts with the water producing hydrogen gas that flows to said hydrogen storage tank means, restoring pressure in said hydrogen storage tank means above the pressure whereat said computer means operates to select a cell.

6. A hydrogen generation system as recited in claim 5, wherein the hydrogen storage tank means contains hydrogen gas at a pressure of between fifty (50) and one hundred (100) psi.

7. A hydrogen generation system as recited in claim 2, further including a processor circuit means connected between the computer and the electrical contacts of each of the cells for selecting an individual cell.

8. A hydrogen generation system as recited in claim 2, wherein the cells are arranged in a bank of cells, which said bank of cells can be disconnected from the storage tank for removal and recharging of individual cells.

9. A hydrogen generation system as recited in claim 1, wherein the valve means is a flap valve formed from a section of a flexible spacer or separator that is fitted into each cell, said section covering over the cell vent opening.

10. A hydrogen generation system as recited in claim 9, wherein the pellet reactive material is an alkali metal or metal hydride; and the pellet is spherical and is coated with a thin coating of aluminum.

11. A hydrogen generation system as recited in claim 10, wherein the means for opening the pellet coating includes a static pressure source containing a gas under pressure and is connected to pressurize a first surface of a reactor piston means to extend said reactor piston means from a first position into the reactor chamber means to where a second reactor piston surface engages said pellet to move said pellet into means for opening said pellet; and means for retracting said reactor piston means to its first position upon an increase in hydrogen gas pressure in the vessel above that of said static pressure source.

12. A hydrogen generation system as recited in claim 11, wherein the reaction piston means first surface is fitted in the static pressure source, and the reactor piston means second surface is immersed in the vessel water; and the means for opening the pellet is a flat blade that is fixed in the reactor chamber means and has a forward cutting edge positioned across said reactor chamber means to align across the pellet contained therein.

13. A hydrogen generation system as recited in claim 12, further including a means for passing a single pellet from a number of like pellets contained in the vessel into a means for passage into the reactor chamber means upon sensing a gas pressure in said vessel at less than the pressure contained in the static pressure source.

14. A hydrogen generation system as recited in claim 13, wherein the means for passing a single pellet is a plate that is journaled to turn so as to move a hole or passage formed therethrough that receives said single pellet and, after said pellet has passed therefrom, said plate is moved out from alignment with the means for passage; and including a means for turning said plate that is connected to the reactor piston means such that travel of said reactor piston means into the reactor chamber means will turn said plate.

15. A hydrogen generation system as recited in claim 14, wherein the reactor piston means first face has a rod extending axially therefrom that includes a helix groove; a follower gear means having an axial opening is arranged for fitting to slide along said rod and is journaled to turn between upper and lower walls of a pellet containing compartment and said follower gear means axial opening contains a ball fitted to travel along said rod helix groove, translating travel of said rod through said follower gear means axial opening into turning of said follower gear means; and said follower gear means includes teeth formed around its outer circumference that mesh with teeth formed around an outer circumference of the plate such that turning of said follower gear means turns also said plate.

16. A hydrogen generation system as recited in claim 10, further including means for filling a bottom portion of the water containing vessel, comprising a pellet filling tube arranged to fit through a hole formed through a transverse divider wall of said water containing vessel; and spring means for arrangement across said hole that is flexed aside by a fitting of an end of said filling tube through said hole.

17. A hydrogen generation system as recited in claim 1, wherein the pellet is formed from sodium.

18. A hydrogen generation system as recited in claim 17, further including the pellet has an aluminum core.

* * * * *